(12) United States Patent
Greisson

(10) Patent No.: US 8,761,743 B2
(45) Date of Patent: Jun. 24, 2014

(54) METHOD AND APPARATUS PERTAINING TO MULTIPLE-CALL PROCESSING

(75) Inventor: Erik Artur Greisson, Malmö (SE)

(73) Assignee: BlackBerry Limited, Waterloo (CA)

( * ) Notice: Subject to any disclaimer, the term of this patent is extended or adjusted under 35 U.S.C. 154(b) by 86 days.

(21) Appl. No.: 13/405,727

(22) Filed: Feb. 27, 2012

(65) Prior Publication Data

US 2013/0225137 A1   Aug. 29, 2013

(51) Int. Cl.
 *H04M 3/42*   (2006.01)
(52) U.S. Cl.
 USPC ......... 455/415; 455/564; 455/414.1; 455/413
(58) Field of Classification Search
 USPC ........ 455/413, 564, 415, 414.1; 715/769, 753
 See application file for complete search history.

(56) References Cited

U.S. PATENT DOCUMENTS

| | | |
|---|---|---|
| 2008/0168361 A1 | 7/2008 | Forstall et al. |
| 2009/0054107 A1* | 2/2009 | Feland et al. ................. 455/564 |
| 2010/0162153 A1 | 6/2010 | Lau |

OTHER PUBLICATIONS

Extended European Search Report from related European Patent Application No. 12157116.0 dated Sep. 19, 2012; 6 pages.

* cited by examiner

*Primary Examiner* — David Q Nguyen
(74) *Attorney, Agent, or Firm* — Fitch, Even, Tabin & Flannery LLP

(57) ABSTRACT

A control circuit, during a call via a wireless transceiver with a first party, permits a user to establish a call via the wireless transceiver with a second party apart from the call with the first party and then, during at least a part of a call-establishment process to establish a call with the second party, displays via a touch-screen display a user-selectable option to return to the call with the first party. This user-selectable option can comprise, at least in part, a moniker for the first party. The control circuit may obtain this moniker by accessing a contacts list. If desired, this user-selectable option can be colored a color that contrasts with other displayed proximal colors then presently displayed on the touch-screen display in order to highlight the user-selectable option's availability.

10 Claims, 5 Drawing Sheets

METHOD AND APPARATUS PERTAINING TO MULTIPLE-CALL PROCESSING

FIELD OF TECHNOLOGY

The present disclosure relates to communications devices and more particularly to multi-call functionality.

BACKGROUND

Two-way communications devices are well known in the art. This includes a wide variety of wireless portable communications devices. Many of these devices facilitate the making of a two-way call (such as, for example, a voice communication between a calling party and a called party). In some cases, some of these devices are able to simultaneously support two separate calls. In many such cases one of the calls is active (such that both the calling party and the called party can currently communicate with one another) while the other call is on hold (such that the respective devices and communications infrastructure maintain the call connection but the calling party and the called party cannot presently communicate with one another).

Establishing a second call while currently engaged in a first call and without dropping or otherwise terminating that first call often includes providing the calling party with a variety of options (regarding, for example, various ways to identify the party to call for that second call). The extent of these options and/or the process of initiating this second call are sometimes considerable. The corresponding cognitive loading for the user can be such that the user may forget or otherwise become confused or uncertain regarding pertinent details of the first call.

Improvements in devices that support multiple simultaneous calls are desirable.

DETAILED DESCRIPTION

Figure 1:
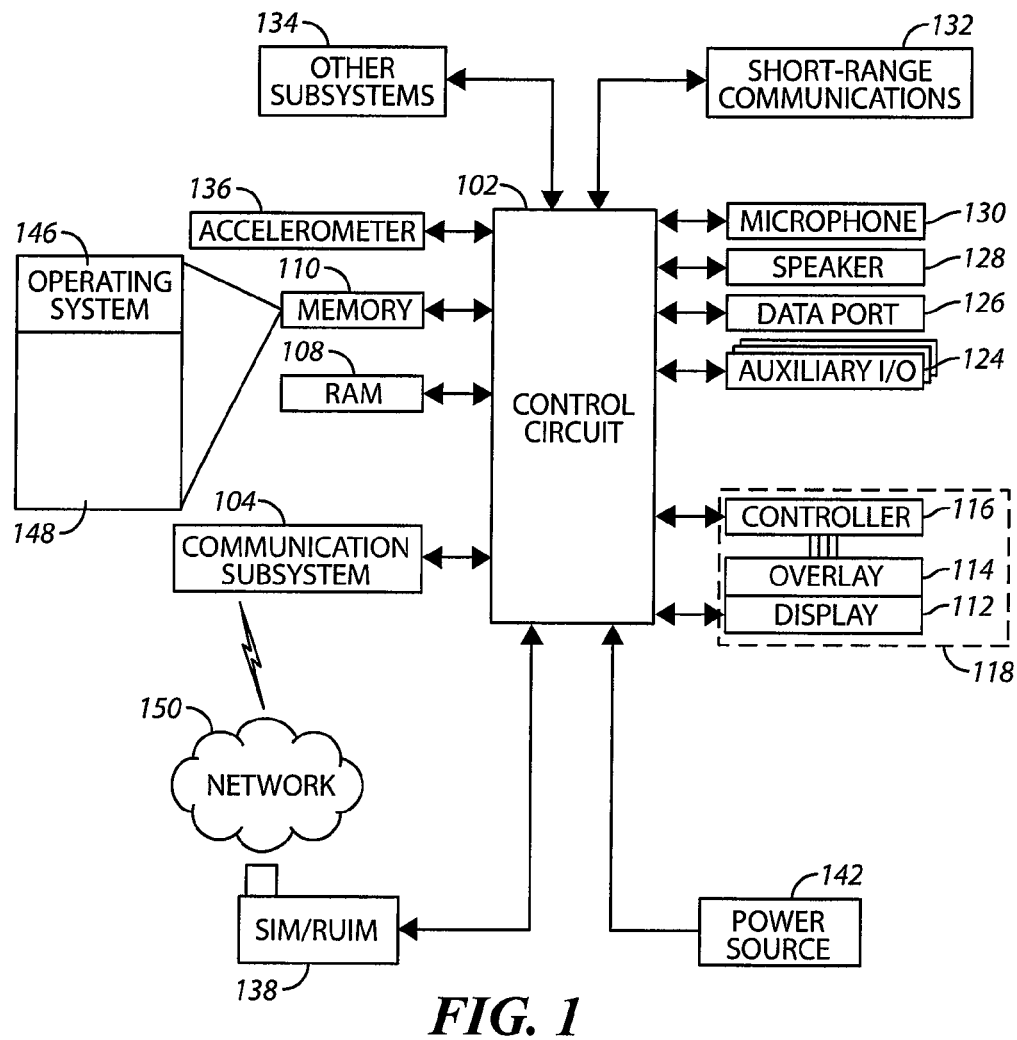
FIG. 1 is a block diagram in accordance with the disclosure.

The following describes an apparatus and method pertaining to a control circuit that, during a call via a wireless transceiver with a first party, permits a user to establish a call via the wireless transceiver with a second party apart from the call with the first party and then, during at least a part of a call-establishment process to establish a call with the second party, displays via the touch-screen display a user-selectable option to return to the call with the first party. By one approach this user-selectable option can comprise, at least in part, a moniker for the first party. The control circuit may obtain this moniker by accessing a contacts list. If desired, this user-selectable option can be colored a color that contrasts with other displayed proximal colors then presently displayed on the touch-screen display in order to highlight the user-selectable option's availability.

So configured, a user can interact with one or more call-establishment screens, menus, and so forth while retaining a simple, intuitive, and accurate reminder of both how to return to a present call with a first party as well as the identity of that first party. These teachings are readily applied in conjunction with existing multi-call functionality practices and hence can serve to significantly leverage the continued viability and utility of those practices. These teachings are also highly scalable in practice and can be extended to include, for example, a plurality of present calls, a plurality of call-connection methodologies, and so forth. The approaches disclosed herein are also readily and economically deployed.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Referring to FIG. 1, an exemplary portable electronic device includes a control circuit 102 (such as a properly programmed processor) that controls the overall operation of the portable electronic device. Communication functions, including data and voice communications, are performed through a communication subsystem 104. The communication subsystem receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device.

The control circuit 102 interacts with other elements, such as a Random Access Memory (RAM) 108, a memory 110, a display 112 with a touch-sensitive overlay 114 operably coupled to an electronic controller 116 that together comprise an optional touch-sensitive display 118 (sometimes referred to herein as a touch-screen display), an auxiliary input/output (I/O) subsystem 124 (which might comprise, for example, a physical keyboard such as a full QWERTY keyboard), a data port 126, a speaker 128, a microphone 130, a short-range communication subsystem 132 (such as, for example, a Bluetooth-based short-range communication subsystem), and other device subsystems 134 of choice.

One or more user interfaces are provided. Input via a graphical user interface is provided via the touch-sensitive overlay 114. The control circuit 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the control circuit 102.

The control circuit 102 may interact with an accelerometer 136 that may be utilized to detect direction of gravitational forces or gravity-induced reaction forces.

To identify a subscriber for network access, the portable electronic device may utilize a Subscriber Identity Module or a Removable User Identity Module (SIM/RUIM) card 138 for communication with a network, such as the wireless network 150. Alternatively, user identification information may be programmed into the memory 110.

The portable electronic device includes an operating system 146 and software programs, applications, or components 148 that are executed by the control circuit 102 and are typically stored in a persistent, updatable store such as the memory 110. Additional applications or programs may be loaded onto the portable electronic device through the wireless network 150, the auxiliary I/O subsystem 124, the data port 126, the short-range communications subsystem 132, or any other suitable subsystem 134. The memory 110 may comprise a non-transitory storage media that stores executable code that, when executed, causes the control circuit 102 to carry out one or more of the functions or actions described herein.

A received signal such as a text message, an e-mail message, or web page download is processed by the communication subsystem and input to the control circuit 102. The control circuit 102 processes the received signal for output to the display 112 and/or to the auxiliary I/O subsystem 124. A subscriber may generate data items, for example e-mail messages, that may be transmitted over the wireless network 150 through the communication subsystem. For voice communications, the overall operation of the portable electronic device is similar. The speaker 128 outputs audible information converted from electrical signals and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. One or more touches, also known as touch contacts, touch events, or sometimes gestures may be detected by the touch-sensitive display 118. The control circuit 102 may determine attributes of the touch, including a location, direction, and/or extent of a touch. Touch location data may include data for an area of contact or data for a single point of contact, such as a point at or near a center of the area of contact.

Figure 2:
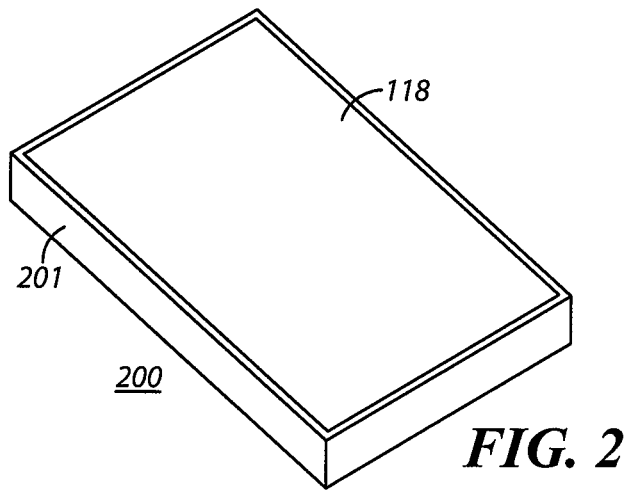
FIG. 2 is a perspective view in accordance with the disclosure.

Referring to FIG. 2, for the sake of illustration but without intending any limitations in these regards, the following description will presume that the portable electronic device comprises a portable two-way wireless communications device 200 such as a so-called smartphone. Such a device 200 often comprises a housing 201 to contain the foregoing components including the aforementioned touch-screen display 118.

Figure 3:
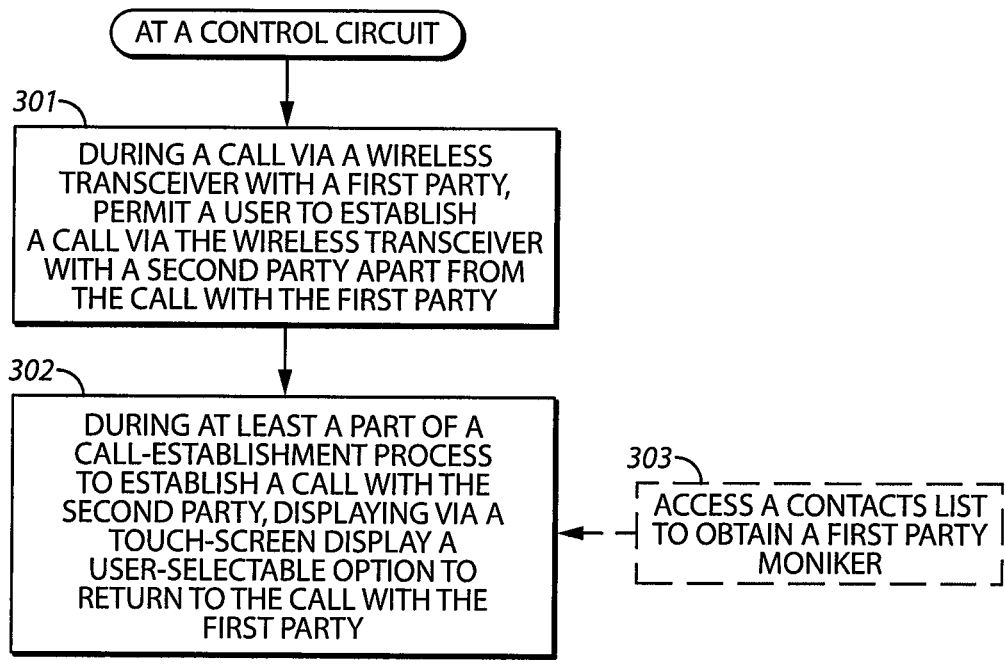
FIG. 3 is a flow diagram in accordance with the disclosure.
Figure 4:
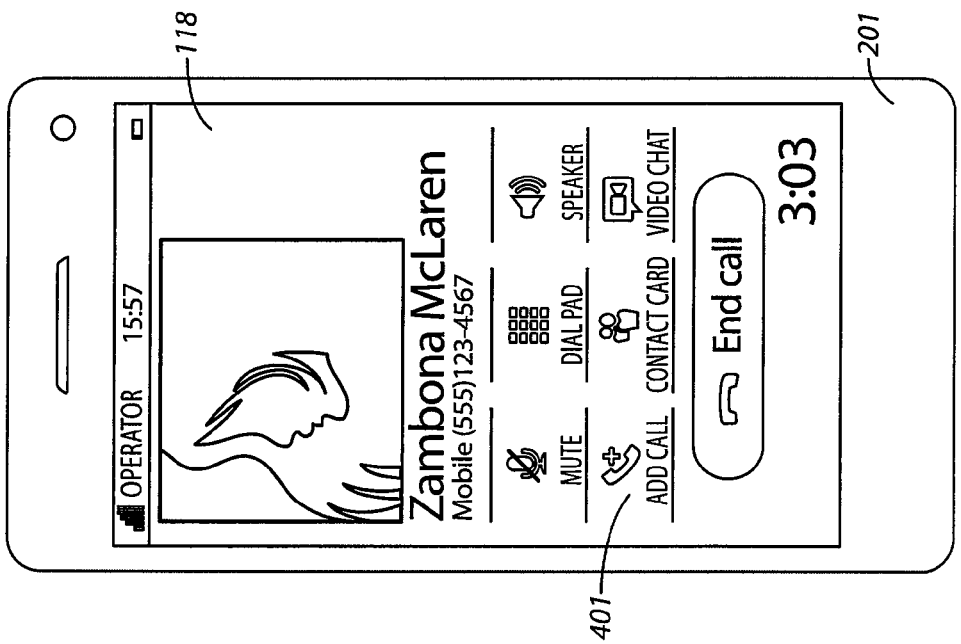
FIG. 4 is a top plan view in accordance with the disclosure.

Referring to FIG. 3 and FIG. 4, the control circuit 102, during a first call via a wireless transceiver (such as the above-described communication subsystem 104) with a first party (in this illustrated example named "Zambona McLaren"), permits 301 a user to establish a second call via the wireless transceiver with a second party apart from the call with the first party. As illustrated in FIG. 4, the control circuit 102 can facilitate this capability via provision of an ADD CALL 401 button on the touch-screen display 118.

In response to the user selecting this add-call option, and during at least a part of a call-establishment process to establish a call with the second party, the control circuit 102 displays 302 via the touch-screen display 118 a user-selectable option to return to the first call with the first party.

Figure 5:
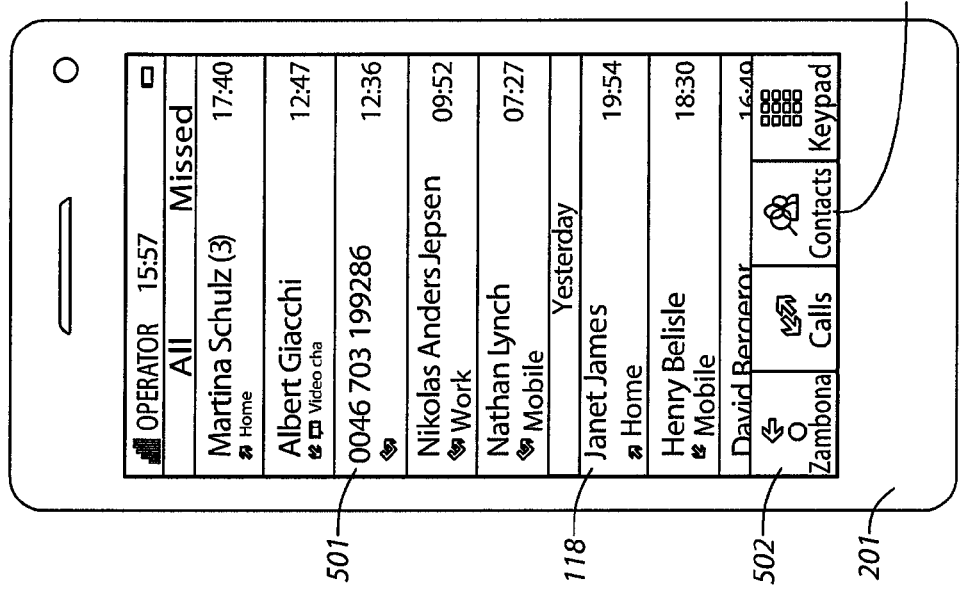
FIG. 5 is a top plan view in accordance with the disclosure.

In this illustrative example, when the user asserts the ADD CALL icon 401 the control circuit 102 provides a list 501, in chronological order, of incoming and outgoing calls as shown in FIG. 5. So configured, the user can select one of these somewhat-recent calls and the corresponding contact information for that selected call is then used to make the second call.

In this case, the aforementioned user-selectable option comprises an icon 502 that includes a "return" arrow. This icon 502 also includes, in this example, a moniker for the first party (here, "Zambona"). This moniker can be retrieved, for example, by having the control circuit 102 access a contacts list (as stored, for example, in the aforementioned memory 110). (As used herein, the term "moniker" will be understood to refer to an identifier for a calling/called party and can comprise a part or all of the party's legal name and/or an alias, nickname, or the like as desired).

If desired, this icon (including, for example, the moniker) can be colored a color that contrasts with other proximal colors then presently displayed on the touch-screen display 118 in order to highlight the user-selectable option's availability. For example, both the moniker and the arrow in the illustrated icon 502 can be colored a uniform dark green (presuming that such a color is not otherwise within some given distance of the icon 502, such as, for example, 0.25 inch, 0.50 inch, 1.0 inch, or other distance of choice).

Figure 6:
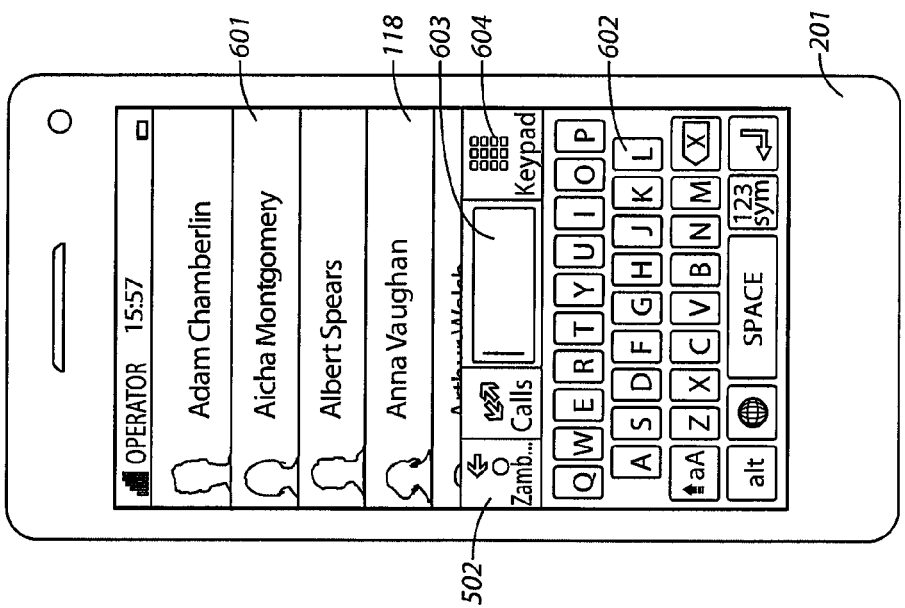
FIG. 6 is a top plan view in accordance with the disclosure.

It is of course possible that the party the user wishes to call does not appear in the recent-calls list 501. To accommodate such a circumstance, the user can select a "CONTACTS" icon 503 to access a contacts list 601 as shown in FIG. 6. By one approach this can include providing the user with a virtual keyboard 602 that the user can utilize to enter a search expression into a corresponding contacts-list search field 603.

This process will support again displaying on the touch-screen display 118 the aforementioned user-selectable option to return to the call with the first party. This can comprise, as illustrated here, including the aforementioned icon 502 as a part of the virtual keyboard 602. As illustrated, these teachings will accommodate the control circuit 102 automatically abridging, truncating, or otherwise shortening a moniker that is too long to suitably accommodate in the space available for this icon 502.

Figure 7:
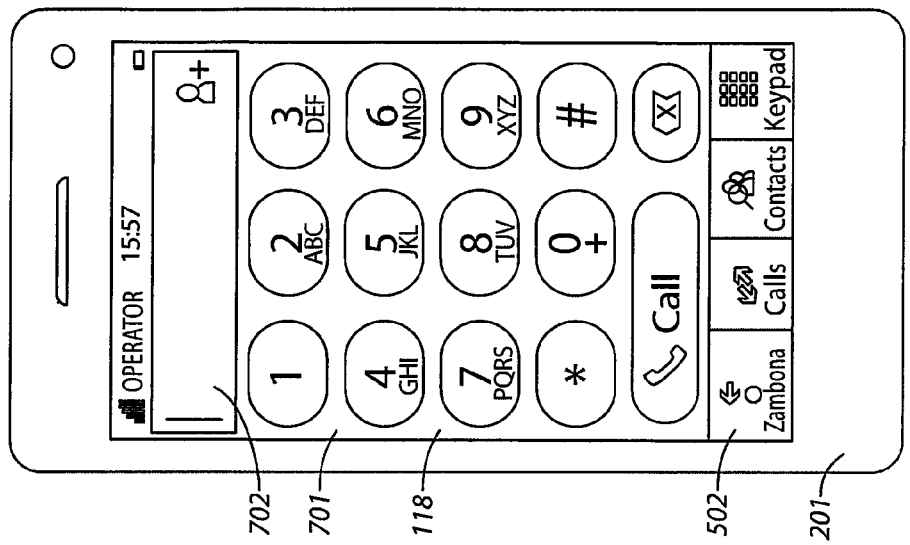
FIG. 7 is a top plan view in accordance with the disclosure.

It is also possible that the number the user wishes to call is not already included in this contact list 601. To accommodate such a circumstance the user can select a KEPYAD icon 604 to bring up a telephone-dialing keypad 701 as shown in FIG. 7. The user can assert the keys of this keypad 701 to enter the desired telephone number into a corresponding entry field 702.

And again, this process will support displaying on the touch-screen display 118 the aforementioned user-selectable option to return to the call with the first party by including the aforementioned return icon 502 as an available option.

Figure 8:
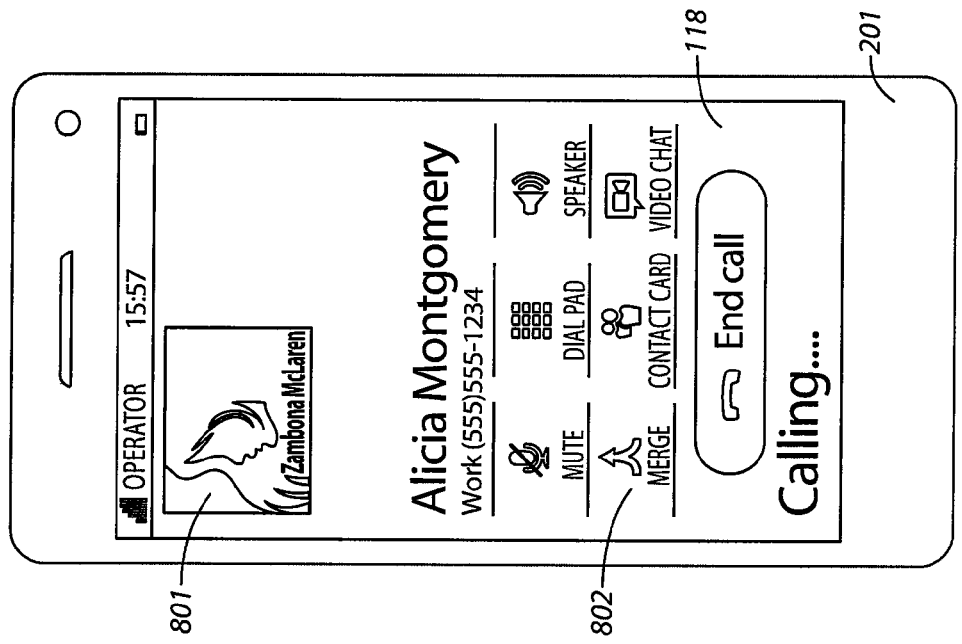
FIG. 8 is a top plan view in accordance with the disclosure.

When the user concludes the call-establishment process and begins the second call, the control circuit 102 can provide a display such as that illustrated in FIG. 8. Here, the control circuit 102 can provide a less-abridged identifier 801 for the first caller. If desired, this identifier 801 can be active; in such a case the user can assert the identifier 801 to place the second call on hold and to return to the first call. If desired, the control circuit 102 can also provide a MERGE icon 802. By selecting the MERGE icon 802 the control circuit 102 will combine the first call and the second call as a conference call.

So configured, and even as the user may traverse a series of different screens as part of the call-establishment process to establish a call with the second party, a single, consistent, simple, and intuitive user-selectable option remains available to the user. By including a moniker for the first party this user-selectable option provides a simple, intuitive, yet-powerful mnemonic device to signal to the user how to return to the first call. The use of color-differentiated highlighting can further serve to underscore such functionality and purpose.

These teachings can be economically deployed and successfully employed with a variety of calling methodologies and technologies. These approaches are highly intuitive for most users and accordingly can be successfully utilized by most users with little or no training.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

I claim:

1. An apparatus comprising:
a wireless transceiver;
a touch-screen display;
a control circuit operably coupled to the touch-screen display and the wireless transceiver and configured to:
during a call via the wireless transceiver with a first party, permitting a user to establish a call via the wireless transceiver with a second party apart from the call with the first party;
during at least a part of a call-establishment process to establish a call with the second party, displaying via the touch-screen display a user-selectable option to return to the call with the first party, wherein the user-selectable option includes a moniker for the first party, which moniker is colored a color that contrasts with other proximal colors then presently displayed on the touch-screen display in order to highlight the user-selectable option's availability.

2. The apparatus of claim 1 further comprising:
a memory have a contacts list stored therein;
and wherein the control circuit operably couples to the memory and is configured to access the contacts list to obtain the moniker to include with the displayed user-selectable option.

3. The apparatus of claim 1 wherein the control circuit is configured to permit the user to establish the call with the second party, at least in part, by displaying on the touch-screen display a virtual keyboard during the call with the first party to facilitate searching a contacts list to access contact information for the second party.

4. The apparatus of claim 3 wherein the control circuit is further configured to also display, when displaying the virtual keyboard during the call with the first party, the user-selectable option to return to the call with the first party.

5. A method comprising:
at a control circuit:
during a call via a wireless transceiver with a first party, permitting a user to establish a call via the wireless transceiver with a second party apart from the call with the first party;
during at least a part of a call-establishment process to establish a call with the second party, displaying via a touch-screen display a user-selectable option to return to the call with the first party, wherein the user-selectable option includes a moniker for the first party, which moniker is colored a color that contrasts with other proximal colors then presently displayed on the touch-screen display in order to highlight the user-selectable option's availability.

6. The method of claim 5 further comprising:
accessing a contacts list to obtain the moniker to include with the displayed user-selectable option.

7. The method of claim 5 wherein permitting the user to establish the call with the second party comprises, at least in part, displaying on the touch-screen display a virtual keyboard during the call with the first party to facilitate searching a contacts list to access contact information for the second party.

8. The method of claim 7 further comprising, when displaying the virtual keyboard during the call with the first party, also displaying the user-selectable option to return to the call with the first party.

9. A non-transitory computer storage medium having instructions stored therein, which instructions, when executed by a processor, cause the processor to:
during a call via a wireless transceiver with a first party, permitting a user to establish a call via the wireless transceiver with a second party apart from the call with the first party;
during at least a part of a call-establishment process to establish a call with the second party, displaying via a touch-screen display a user-selectable option to return to the call with the first party, wherein the user-selectable option includes a moniker for the first party, which moniker is colored a color that contrasts with other proximal colors then presently displayed on the touch-screen display in order to highlight the user-selectable option's availability.

10. The non-transitory computer storage medium of claim 9 wherein the instructions further cause the processor to:
access a contacts list to obtain the moniker to include with the displayed user-selectable option.

* * * * *